Nov. 18, 1941.   E. W. ALLEN   2,263,061
LAMP MOUNTING
Filed Sept. 7, 1938

Inventor
Everett W. Allen
By Blackmor, Spencer & Flint
Attorneys

Patented Nov. 18, 1941

2,263,061

UNITED STATES PATENT OFFICE 2,263,061

LAMP MOUNTING

Everett W. Allen, Birmingham, Mich., assignor to Yellow Truck and Coach Manufacturing Company, Pontiac, Mich., a corporation of Maine Application September 7, 1938, Serial No. 228,812

4 Claims. (Cl. 240—7.1)

This invention has to do with lamp mountings especially adapted for the mounting of lamps on panels such as the sheet metal panels of automobile bodies. It has been found especially useful in mounting marker lamps on the rear body panels of busses and in mounting dome lamps in their interior.

According to the invention the lamp is provided with a mounting stud projecting from its base and preferably serving as a conduit for the passage of conductors supplying current to the lamp bulb. A hole somewhat larger than the diameter of the stud is punched in the panel and in it is fitted a rubber grommet which preferably has flanges engaging the opposite sides of the panel to hold the grommet in place. To mount the lamp it is only necessary to thread the conductors through the aperture in the grommet and then thrust the mounting stud of the lamp into the hole in the grommet. The mounting stud is of slightly larger diameter than the grommet opening so that it is gripped by the grommet and firmly held in place and yet may be readily removed by simply pulling it outwardly.

The construction has the advantages of low cost and wide application. It possesses the further advantage that, where used as a marker lamp, if it is struck by some projection such as an overhanging limb, the lamp is pulled out of its mounting without tearing the expensive body panel.

In the drawing

Figure 2:
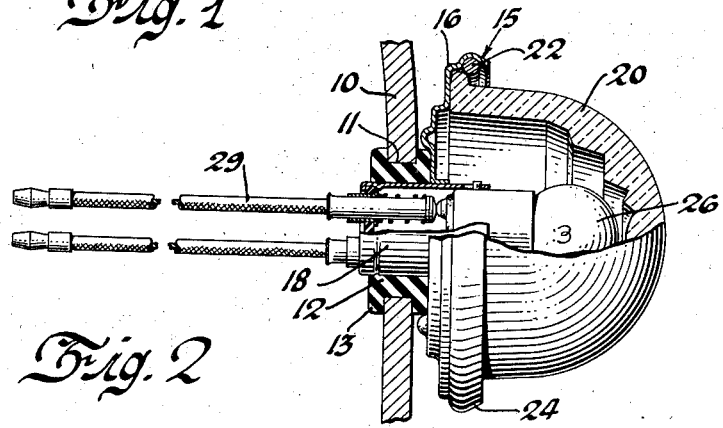
Figure 2 is a partial section through one of the lamps and its mounting.

In Figure 2, 10 indicates a body panel apertured at 11 to receive rubber grommet 12 provided with flanges 13 which grip the opposite sides of the panel. 15 indicates the lamp consisting of stamping 16 serving as the lamp base and having projecting stud in the form of a sleeve 18 engaged in the opening in the grommet 12. Sleeve 18 also serves as the socket for the lamp bulb. Since the stud is somewhat larger in diameter than the opening in the grommet, its insertion expands the grommet and causes it to grip the stud 18 thereby holding the lamp securely in place.

The lamp may be of any suitable construction. I have shown it equipped with lens 20 which is held within an annular seat in the base 16 by means of a split expansible spring wire 22 held in position by turned-in flange 24. 26 indicates the usual incandescent bulb mounted in socket 18 and supplied with current through conductors 29 mounted in the other end of the socket. These features are conventional.

Figure 1:
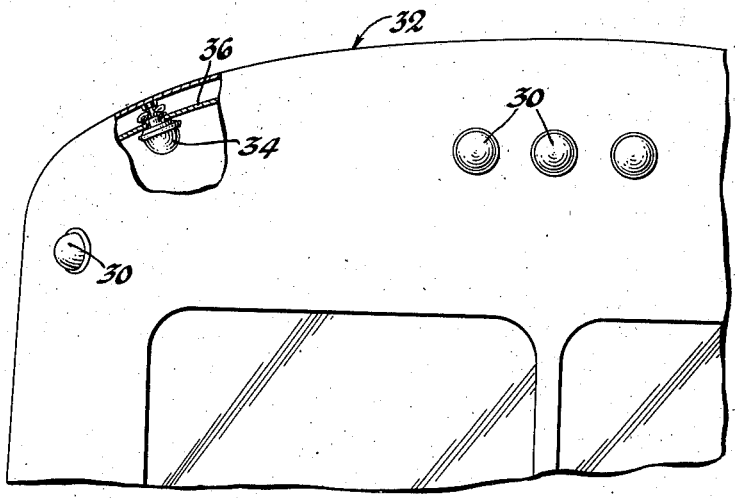
Figure 1 illustrates the rear upper portion of a bus body showing the improved mounting used for marker lamps and dome lamps.

Referring now to Figure 1, 30 indicates lamps of the construction described mounted according to my invention as marker lamps on the rear of the bus indicated at 32. 34 indicates a similar unit mounted in a ceiling panel 36 in the interior of the bus.

Figure 3:
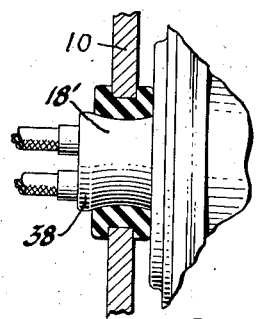
Figure 3 is a fragmentary view showing a slight modification.

In Figure 3, there is shown a slight modification in which the mounting stud 18' is provided at its free end with a slightly enlarged portion 38 which further assists in resisting withdrawal of the lamp.

Figure 4:
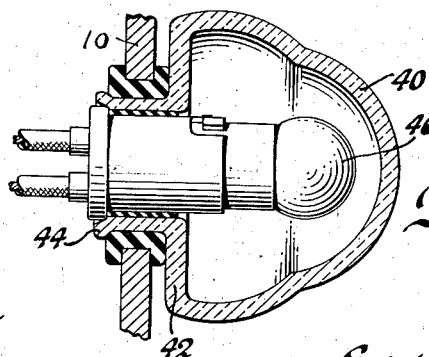
Figure 4 is a view similar to Figure 2 illustrating a further variation.

In the modification shown in Figure 4 the globe 40 and the lamp base 42 with its projecting stud 44 are made in one piece of suitable material, either glass or plastic, and the bulb 46 and its socket are suitably mounted in the opening through the stud 44. In other respects the method of mounting is the same as previously described.

I claim:

1. The combination of a lamp having a sheet metal base, a globe secured to the base and forming a lamp housing therewith, a sheet metal lamp socket secured in the base and projecting rearwardly therefrom, an incandescent lamp bulb mounted in the socket within the housing, connectors secured in the other end of the socket and supplying current to the bulb, a support having an aperture therein somewhat larger than the socket, a rubber grommet having a groove in its outer periphery, said grommet being fitted in the aperture in the support with the edges of the support received in the groove and with the sides of the groove gripping the opposite faces of the support, the lamp having the projecting portion of its socket detachably engaged in the aperture in the grommet so as to expand the latter and cause it to yieldingly grip the socket and the support to hold the lamp in place.

2. In the combination as defined in claim 1, said socket having its outer end enlarged to resist its withdrawal from the grommet.

3. A vehicle body having an aperture in a wall thereof, a grommet of elastic material fitted in said aperture, and a lamp having a dome shaped lens element, a base element and a cylindrical element projecting from said base element through which electrical conductors extend; said elements being secured together so as to form a hard non-yieldable and rigid housing for a lamp bulb mounted therein, said aperture in said vehicle body being somewhat larger than said projecting element, the hole through the grommet before assembly being somewhat smaller than the projecting element of the lamp, said grommet having a groove in its outer periphery receiving the edges of the aperture and providing opposed lips gripping the opposite sides of said edges of the aperture, and the projecting element of the lamp being frictionally and detachably engaged by the walls of the hole of said grommet so as to cause distortion of the grommet and consequent yielding gripping of said projecting element and the edges of said aperture by the grommet to secure said lamp to said vehicle body so that the lamp may be pulled out of the aperture, without damage to the vehicle body, by a force applied to the lamp and acting in a direction generally parallel to the line of movement of the vehicle.

4. The device defined in claim 3, and characterized by said projecting element having its outer end enlarged to resist easy removal of said lamp from the vehicle wall.

EVERETT W. ALLEN.